US009922572B2

(12) United States Patent
Daveau et al.

(10) Patent No.: US 9,922,572 B2
(45) Date of Patent: Mar. 20, 2018

(54) METHOD AND DEVICE FOR AUTOMATICALLY DETERMINING A RUNWAY STATE USING REFERENCE DISTANCES FOR AN ADHESION LIMITATION ZONE

(71) Applicant: AIRBUS OPERATIONS (S.A.S.), Toulouse (FR)

(72) Inventors: Nicolas Daveau, Toulouse (FR); Laurent Berdoulat, Gagnac-sur-Garonne (FR); Houssam Soueid, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 15/254,026

(22) Filed: Sep. 1, 2016

(65) Prior Publication Data
US 2017/0061806 A1 Mar. 2, 2017

(30) Foreign Application Priority Data
Sep. 2, 2015 (FR) ...................................... 15 58133

(51) Int. Cl.
G08B 21/00 (2006.01)
G08G 5/02 (2006.01)
B60T 8/17 (2006.01)
G08G 5/00 (2006.01)
G08G 5/06 (2006.01)
B60T 8/172 (2006.01)

(52) U.S. Cl.
CPC ............... *G08G 5/02* (2013.01); *B60T 8/172* (2013.01); *B60T 8/1703* (2013.01);
(Continued)

(58) Field of Classification Search
CPC .... B60T 2210/12; B60T 8/1703; B60T 8/172; G08G 5/0013; G08G 5/0021
(Continued)

(56) References Cited

U.S. PATENT DOCUMENTS 8,116,989 B2 2/2012 Journade et al.
9,299,261 B2 3/2016 Jones
(Continued)

FOREIGN PATENT DOCUMENTS

EP 2554443 A1 2/2013
FR 2930669 A1 10/2009

OTHER PUBLICATIONS

French Search Report for FR 1558133 dated Jun. 16, 2016.

*Primary Examiner* — Mark Rushing
(74) *Attorney, Agent, or Firm* — Wilson, Wilson, Taylor & Hunt, P.A.

(57) ABSTRACT

An estimation unit including an element for computing an actual distance, representing the distance covered by the aircraft over at least one speed interval delimited between two speeds of the aircraft, the interval corresponding to rollout on a segment of the runway, for which the braking performance of the aircraft is limited by the friction of the runway, an element for computing a plurality of so-called reference distances corresponding to various runway states, an element for comparing the actual distance with the reference distances, and an element for selecting, on the basis of these comparisons, one of the reference distances, the runway state which corresponds to the reference distance thus selected representing the runway state determined by the device.

15 Claims, 3 Drawing Sheets

(52) U.S. Cl.
CPC ......... *G08G 5/0013* (2013.01); *G08G 5/0021* (2013.01); *G08G 5/0091* (2013.01); *G08G 5/025* (2013.01); *G08G 5/065* (2013.01); *B60T 2210/12* (2013.01)

(58) Field of Classification Search
USPC ........................................................ 340/971
See application file for complete search history.

(56) References Cited

U.S. PATENT DOCUMENTS

| | | | | |
|---|---|---|---|---|
| 2008/0154445 | A1* | 6/2008 | Goodman | B64C 25/426 701/3 |
| 2013/0127642 | A1 | 5/2013 | Maggiore et al. | |
| 2014/0012437 | A1* | 1/2014 | Jones | B60T 8/1703 701/15 |
| 2014/0257603 | A1* | 9/2014 | McKeown | B64D 45/00 701/16 |
| 2014/0371958 | A1* | 12/2014 | Lascombes | G08G 5/02 701/16 |
| 2015/0012201 | A1* | 1/2015 | Metzger | B60T 8/1703 701/82 |
| 2015/0120098 | A1* | 4/2015 | Catalfamo | G08G 5/02 701/16 |
| 2015/0298817 | A1* | 10/2015 | Jackson | B64D 45/00 701/3 |
| 2015/0302753 | A1* | 10/2015 | Henderson | G08G 5/02 701/18 |

* cited by examiner

METHOD AND DEVICE FOR AUTOMATICALLY DETERMINING A RUNWAY STATE USING REFERENCE DISTANCES FOR AN ADHESION LIMITATION ZONE

CROSS-REFERENCE TO RELATED APPLICATION

This application claims priority to French Patent Application FR 15 58133 filed Sep. 2, 2015, the entire disclosure of which is incorporated by reference herein.

TECHNICAL FIELD

The present disclosure relates to a method and a device for automatically determining a runway state, as well as to a system for aiding the landing of aircraft, at least one of which is equipped with such a device.

BACKGROUND

During rollout of an aircraft, in particular a transport airplane, on a runway of an airport, in the course of a landing phase, knowledge of the surface state of the runway is extremely important. Indeed, the prediction of the aircraft's braking performance depends on this knowledge. Indeed, in this case, it is possible to:

best estimate the distance required to stop the aircraft in a desire for safety; and not overestimate the stopping distance required to immobilize the aircraft, and therefore not penalize, unduly, the usage operations in respect of the runway and the aircraft.

Indeed, it is known that a lower than expected runway coefficient of friction or a greater than reported presence of contaminant form part of the main factors in respect of runway overshoot during landing.

However, the braking performance of an aircraft on a contaminated runway is very difficult to predict because of the difficulty of ascertaining, in a reliable and accurate manner, the contribution of the runway state to the deceleration of the aircraft, in particular in terms of adhesion and spray drag and displacement drag in the case of thick contaminant.

The contaminants may be any element settling on the runway, such as for example rubber deposited during previous landings, oil, rainwater forming a more or less uniform layer on the runway, snow, ice, etc. Knowledge of the runway state may therefore be exploitable in order to improve landing systems.

It is known that standard algorithms for runway state identification are based on a comparison between the current braking forces and reference braking forces (which represent the braking forces that the aircraft would have on reference states of the runway).

However, such an estimation of the state of the runway may exhibit inconsistencies in certain situations.

This standard solution is therefore not optimal.

SUMMARY

An object of the present disclosure is to remedy this drawback and to provide an item of information about the state of the runway, which is determined on the basis of parameters of the aircraft and which is representative of the state, such as perceived at the level of the aircraft, of the runway.

The present disclosure relates to a method for automatically determining a runway state, the method comprising the following steps:

a data generating step comprising or consisting of generating the current value of at least one parameter of the aircraft, during ground rollout of the aircraft on the runway;

an estimation step comprising or consisting of estimating at least one runway state with the aid of the current value; and a transmission step comprising or consisting of transmitting at least one item of information relating to this runway state to at least one user outside the aircraft.

According to the disclosure herein, the estimation step comprises:

a first computation sub-step comprising or consisting of computing a so-called actual distance, representing the distance covered by the aircraft over at least one speed interval delimited between two computation speeds, the speed interval corresponding to rollout on at least one segment of the runway, for which the braking performance of the aircraft is limited by the adhesion of the runway;

a second computation sub-step comprising or consisting of computing over the at least one speed interval, a plurality of so-called reference distances corresponding, respectively, to various runway states;

a comparison sub-step comprising or consisting of comparing the actual distance with the reference distances; and a selection sub-step comprising or consisting of selecting, on the basis of these comparisons, one of the reference distances, the runway state which corresponds to the reference distance thus selected representing the runway state determined by the method.

Thus, by virtue of the disclosure herein, a runway state information item is provided, which is determined on the basis of parameters and of models of the aircraft, as specified hereinbelow, and which is representative of the runway state such as perceived at the level of the aircraft, by taking into account a landing distance (the actual distance) and by comparing it with reference distances representative of various runway states.

Advantageously, the first computation sub-step comprises or consists of computing the actual distance:

by interpolation of an actual position of the aircraft on the runway; or by integration of an actual ground speed of the aircraft.

Furthermore, in an advantageous manner, the first computation sub-step comprises or consists of computing the at least one speed interval by defining an adhesion limitation zone corresponding to a segment of the runway, for which the braking performance of the aircraft is limited by the adhesion (or friction) of the runway, with the aid of at least one of the following procedures:

a first procedure comprising or consisting of comparing at least one braking pressure commanded on the aircraft with the corresponding braking pressure applied to the aircraft;

a second procedure comprising or consisting of comparing at least one actual deceleration on the aircraft, in response to a braking implemented on the aircraft, with the expected deceleration on the aircraft in response to the same braking.

Moreover, advantageously, the second computation sub-step comprises or consists of computing each reference distance $D_{REF_i}$, corresponding to a runway state referenced by an index i, with the aid of the following expression:

$$D_{REF_i} = \int_{V_{start}}^{V_{end}} \frac{m \cdot V}{T - D - \mu_{REF_i} \cdot Fz_{MG} - \mu_r \cdot Fz_{NG}} dV$$

in which:

$V_{start}$ is a first of the speeds delimiting the speed interval;

$V_{end}$ is the second of the speeds delimiting the speed interval;

MG refers to the main landing gear of the aircraft, which carries the braked wheels;

NG refers to the front landing gear of the aircraft, which carries the unbraked wheels;

Fz corresponds to a normal force applied to the corresponding landing gear of the aircraft;

m is the mass of the aircraft;

V is the actual ground speed of the aircraft;

T is a longitudinal thrust generated by the engines of the aircraft while the aircraft is rolling;

D is a drag of the aircraft while rolling;

$\mu_r$ is a coefficient of friction due to the rolling resistance of the unbraked wheels; and $\mu_{REF_i}$ is a predetermined reference friction level, for the runway state of index.

Moreover, advantageously, the selection sub-step comprises or consists of selecting, from among the reference distances, the reference distance for which the difference between the actual distance and this reference distance exhibits a negative value, and whose absolute value is the lowest.

Furthermore, in an advantageous manner, the estimation step comprises a third computation sub-step comprising or consisting of verifying whether an application condition is fulfilled, by verifying whether:

$$\int_\Omega \frac{m \cdot V}{T - D - \mu_{REF} \cdot Fz_{MG} - \mu_r \cdot Fz_{NG}} dV \Big) \int_\Omega V dt$$

in which:

$\Omega$ represents the set of braking zones;

MG refers to the main landing gear of the aircraft, which carries the braked wheels;

NG refers to the front landing gear of the aircraft, which carries the non-braked wheels;

Fz corresponds to a normal force applied to the corresponding landing gear of the aircraft;

m is the mass of the aircraft;

V is the actual ground speed of the aircraft;

T is a longitudinal thrust generated by the engines of the aircraft while the aircraft is rolling;

D is a drag of the aircraft while rolling;

$\mu_r$ is a coefficient of friction due to the rolling resistance of the unbraked wheels; and $\mu_{REF}$ is a predetermined reference friction level.

Moreover, advantageously, the estimation step comprises an auxiliary computation sub-step comprising or consisting of computing a confidence indicator associated with the runway state determined, the confidence indicator being transmitted in the transmission step with the runway state information. Preferably, the auxiliary computation sub-step comprises or consists of computing, as confidence indicator, a probability $P_i(Y)_0$ of exact estimation of the runway state determined, the probability being computed with the aid of the following expression:

$$P_i(Y_0) = \Phi\left(\frac{1 - Y_0}{\sigma_Y}\right) - \Phi\left(-\frac{Y_0}{\sigma_Y}\right)$$

in which:

$Y_0$ is a reference value, representing the relative positioning of the actual performance of the aircraft between the two reference levels which bound it;

$\Phi$ is a cumulative distribution function; and $\sigma_Y$ is a standard deviation.

The present disclosure also relates to a device for automatically determining a runway state, the device comprising:

a data generating unit configured to generate the current value of at least one parameter of the aircraft, during ground rollout of the aircraft on the runway;

an estimation unit configured to estimate at least one runway state with the aid of the current value; and a transmission unit configured to transmit at least one item of information relating to this runway state to at least one user outside the aircraft.

According to the disclosure herein, the estimation unit comprises:

a computation element configured to compute a so-called actual distance, representing the distance covered by the aircraft over at least one speed interval delimited between two speeds of the aircraft, the speed interval corresponding to rollout on at least one segment of the runway, for which the braking performance of the aircraft is limited by the adhesion of the runway;

a computation element configured to compute over the at least one speed interval, a plurality of so-called reference distances corresponding, respectively, to various runway states;

a comparison element configured to compare the actual distance with the reference distances; and a selection element configured to select, on the basis of these comparisons, one of the reference distances, the runway state which corresponds to the reference distance thus selected representing the runway state determined by the device.

In a particular embodiment, the estimation unit comprises a third computation element configured to verify whether an application condition is fulfilled.

Furthermore, in another embodiment, the estimation unit comprises an auxiliary computation element configured to compute a confidence indicator associated with the runway state determined, the confidence indicator being transmitted by the transmission unit with the runway state information. Preferably, the auxiliary computation element comprises a neural network.

Moreover, the disclosure herein also relates to an aircraft, in particular a transport airplane, which comprises a device for determining a runway state, such as that aforementioned.

The present disclosure relates, furthermore, to a system for aiding the landing of aircraft. According to the disclosure herein, this system for aiding landing comprises at least one device for determining a runway state such as that described hereinabove, which is fitted to at least one aircraft, and a ground station able to receive an item of information relating to the runway state determined by the device and able to transmit this runway state information, optionally to at least one other aircraft in the approach phase with a view to landing on the runway.

BRIEF DESCRIPTION OF THE DRAWINGS

The appended figures will elucidate the manner in which the disclosure herein may be embodied. In these figures, identical references designate similar elements.

DETAILED DESCRIPTION

Figure 1:
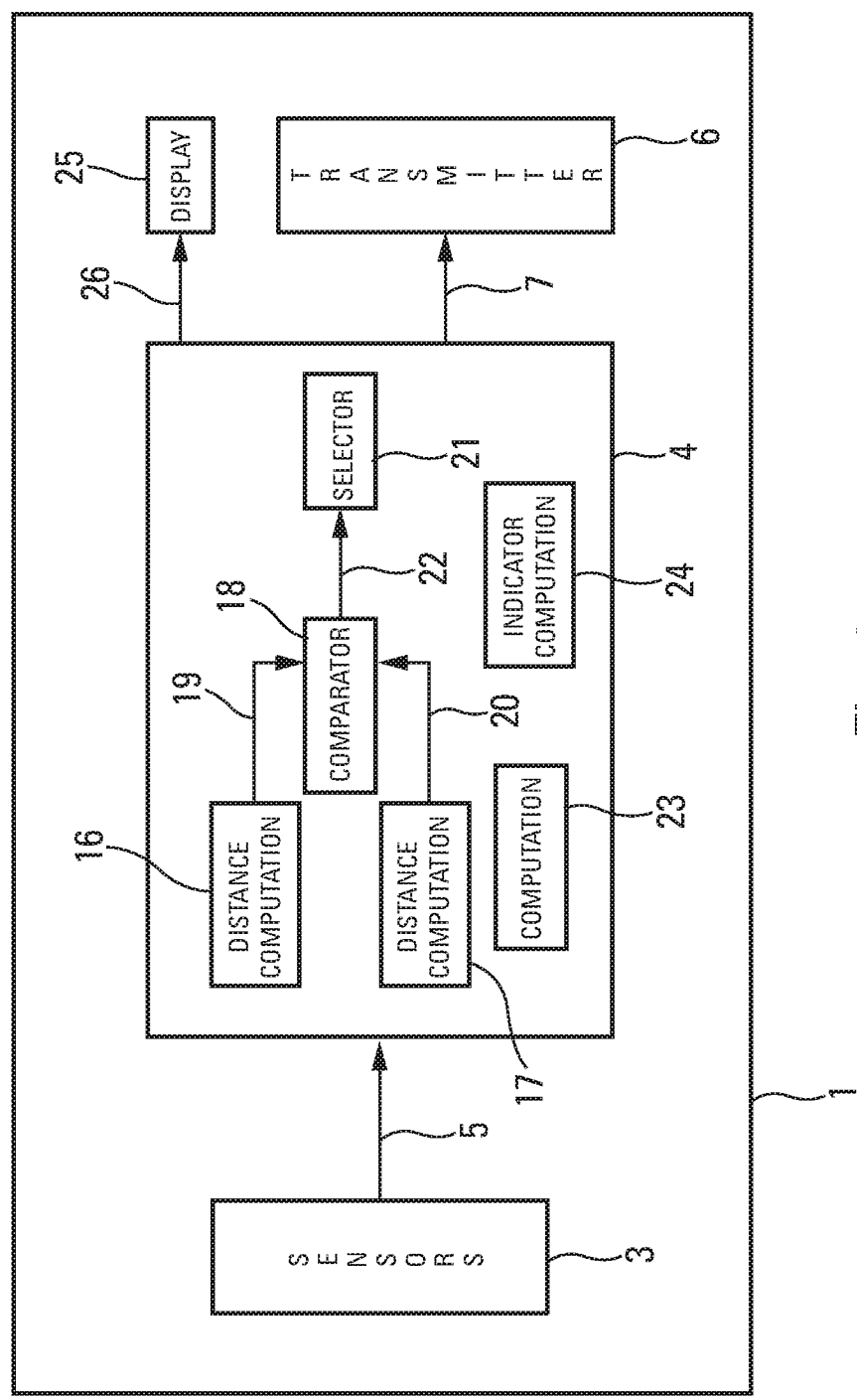
FIG. 1 is the schematic diagram of a device for automatically determining a runway state, which illustrates an embodiment of the disclosure herein.

The device 1 represented schematically in FIG. 1 and making it possible to illustrate the disclosure herein, is a device for automatically determining a runway state from an aircraft AC (FIG. 2), in particular a transport airplane.

This device 1 is used, during a landing, while the aircraft AC is rolling on a runway 2 of an airport.

The device 1 which is at least in part embedded on board the aircraft AC, comprises in particular, as represented in FIG. 1:

a data generating unit 3 comprising, in particular, a set of sensors or other standard measurement elements, which are configured to generate the current values of parameters of the aircraft (ground speed, acceleration, braking modes, position of the control surfaces, etc.), during ground rollout of the aircraft AC on the runway 2 after a landing;

an estimation unit 4, specified hereinabove, which is connected by way of a link 5 to the data generation unit 3 and which is configured to estimate a runway state (for the runway 2) with the aid of the current values; and a transmission unit 6 ("TRANSMITTER"), which is connected by way of a link 7 to the estimation unit 4 and which is configured to transmit at least this runway state information to at least one user outside the aircraft.

Figure 2:
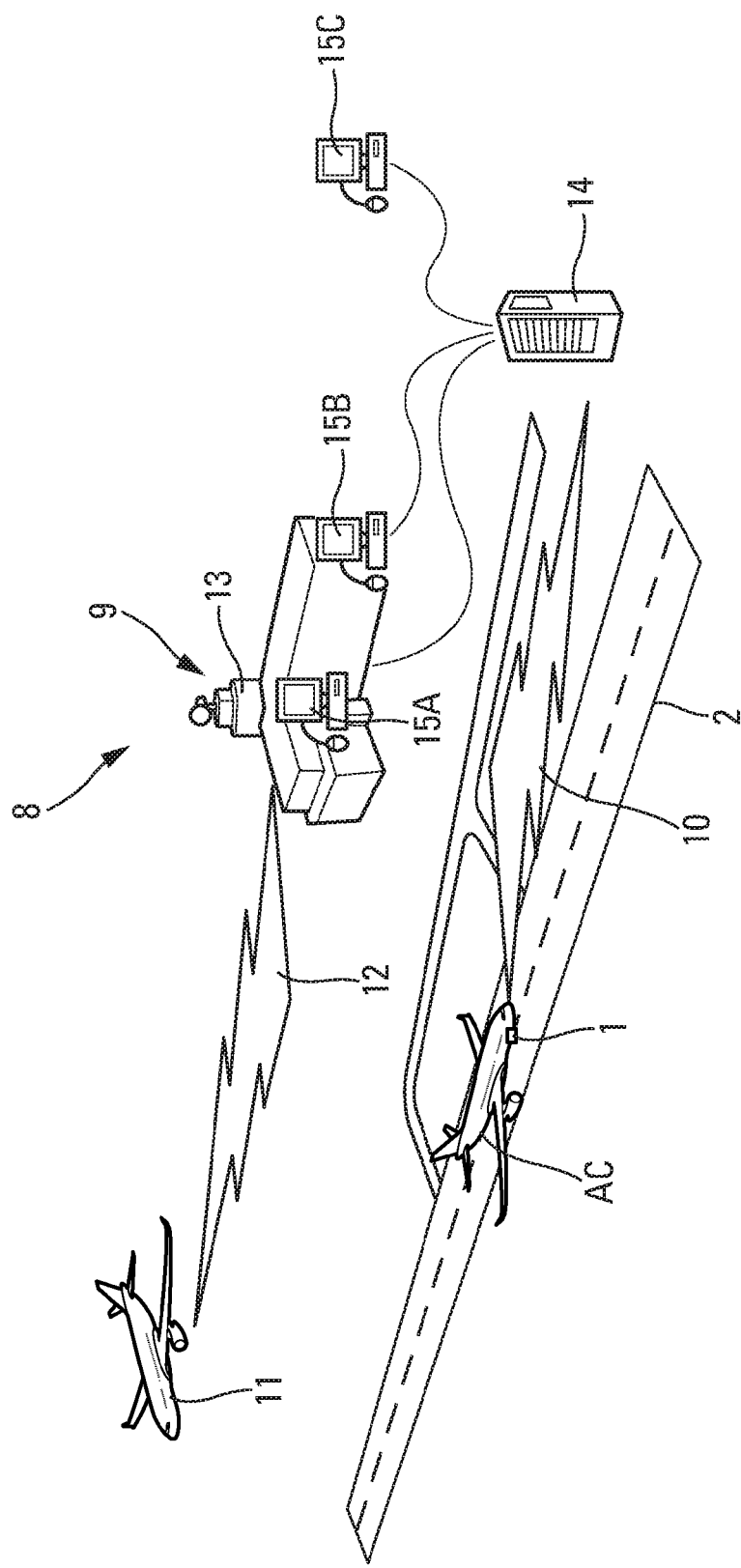
FIG. 2 is a schematic view illustrating a system for aiding landing.

The device 1 forms part, preferably, of a system 8 for aiding aircraft landing, such as represented in FIG. 2.

This system 8 for aiding landing comprises at least one device 1 for determining a runway state, which is fitted to at least one aircraft AC, as well as a ground station 9. The ground station 9 is able to receive from the aircraft AC, via a wireless transmission link, illustrated by an arrow 10, an item of information relating to the runway state determined by the onboard device 1. The ground station 9 is able to transmit this runway state information to at least one other aircraft 11 in the approach phase with a view to a landing on the runway 2, via a wireless transmission link, illustrated by an arrow 12.

In the example represented in FIG. 2, the station 9 comprises a control tower 13 of the airport, and it is linked to the aircraft AC via a server 14 which receives the information from the aircraft AC (arrow 10) and which communicates with various communication posts 15A, 15B, 15C, for example by way of a wired link, at least one of which is a communication post 15A installed in the control tower 13 or at the disposal of an airport operator.

The runway state can be provided in the form of a braking action on a runway, making it possible to quantify the braking performance of the aircraft when landing on a runway. It allows the crew of the aircraft to apprise the control tower 13 and/or the airport operator of the braking performance when rolling during the landing phase.

This information can be used by the control tower 13 and/or the airport operator as additional information (which characterizes the state of the runway), and can thereafter be provided to the aircraft 11 in the approach so that they can verify whether their landing distance is compatible with the runway length available and optionally adapt their landing technique, or even divert if necessary.

The system 8 implements in particular the following steps:

evaluation of the runway state of the runway 2 by the device 1 fitted to the aircraft AC which is rolling on this runway 2;

report to the control tower 13 (arrow 10) and/or to the airport operator via the server 14;

report from the control tower 13 to one or more approaching aircraft 11 via standard means (ATIS, METAR, voice, etc.), as illustrated by the arrow 12;

the one or more approaching aircraft 11 use the report on the runway state, to evaluate, in a standard manner, the landing performance.

Whatever embodiment is envisaged, the data generation unit 3 comprises standard sensors which are embedded on board the aircraft AC.

In a preferred embodiment, represented in FIGS. 1 and 2, the device 1 is entirely on board the aircraft AC. In this case:

the estimation unit 4 can form part of a control computer of the aircraft AC, for example of ATSU ("Air Traffic Services Unit") type or a so-called CPIOM card ("Integrated Modular Avionics") or else a flight control computer, which receives information from the data generation unit 3; and the transmission unit 6 is a standard data transmission unit, wireless, between the aircraft AC and the server 14.

In this case, the runway state information (or braking action information) is transmitted automatically by the device 1, optionally after validation by the pilot.

As a variant, the estimation unit 4 can be integrated into an Electronic Flight Bag EFB, which can be connected to avionic systems to receive the information generated by the data generation unit 3.

In another variant embodiment, the estimation unit 4 can be integrated into a computer installed on the ground, to which the information generated by the data generation unit 3 is provided and which is transmitted to the ground by way of a wireless communication means.

The device 1 comprises, also, a display unit 25 ("DISPLAY"), for example of CDS ("Cockpit Display System") type, which displays, in the flight deck, the information generated by the estimation unit 4, and in particular the runway state determined. Thus, in a variant embodiment, the pilot can communicate the runway state to the control tower through a standard means of voice communication.

Moreover, in another variant embodiment, as a supplement or as a variant to the transmission of the runway state information to the ground post 9, this information can be transmitted directly from the aircraft AC equipped with the device 1 to other aircraft 11, in particular in the approach.

According to the disclosure herein, the estimation unit 4 comprises, as represented in FIG. 1:

a computation element 16 ("DISTANCE COMPUTATION") configured to compute a so-called actual (or real) distance. This actual distance represents the distance actually covered by the aircraft over one or more defined (or delimited) speed intervals, each time, between two speeds of the aircraft;

a computation element 17 ("DISTANCE COMPUTATION") configured to compute a plurality of so-called reference distances. These reference distances correspond, respectively, to various runway states and are computed over the speed interval or intervals;

a comparison element 18 ("COMPARATOR") which is connected by way of links 19 and 20, respectively, to the computation elements 16 and 17, and which is configured to compare the actual distance computed by the computation element 16 with the reference distances computed by the computation element 17; and a selection element 21 ("SELECTOR") which is connected by way of a link 22 to the comparison element 18, and which is configured to select, on the basis of these comparisons, the braking action corresponding to the reference distance closest, by being the safest, to the actual distance.

The runway state, corresponding to the reference distance selected by the selection element 21, represents the runway state determined by the device 1 for the runway 2 (and transmitted by the transmission unit 6).

Within the framework of the present disclosure:

each speed interval considered is defined by the two speeds of the aircraft, respectively, at the start (or at the entry) and at the end (or at the exit) of an adhesion limitation zone;

a friction reduction zone represents at least one segment of the runway 2, for which the braking performance of the aircraft is limited by the maximum adhesion (or friction) that can be offered by the runway 2. This limitation may be reached rapidly because of the presence of liquid and/or solid contaminants (water, ice, snow, oil, etc.) on the surface of the runway 2.

The various processing implemented by the estimation unit 4 is therefore based on the landing distance which represents a very simple criterion. The estimation unit 4 compares the real distance covered by the aircraft, with theoretical distance (reference distance) that the same aircraft would cover on the various reference levels.

The result selected by the selection element 21 of the device 1 is, as specified hereinbelow, the reference runway state giving the covered distance which is closest, greater than or equal to the actual (or real) distance actually covered by the aircraft during the landing. The runway state selected must guarantee secure evaluation of the landing distance for aircrafts in the approach. Stated otherwise, this implies that the reference distance corresponding to this runway state determined by the device 1 must be longer than the actual distance. Thus, pilots in the approach do not overestimate their braking capacity on such a runway.

The distance traversed between two speeds (the real distance and hypothetical distances which correspond to various levels) is compared. These two speeds, namely $V_{start}$ and $V_{end}$ specified hereinbelow, limit the runway speed interval in which the braking of the aircraft has been limited by the friction (or adhesion) of the runway 2.

The computation element 16 comprises a computer or processor (integrated) which computes the actual (real) distance dE of the aircraft.

In a first embodiment, the computation element 16 comprises a computer or processor which computes the actual distance dE1 of the aircraft by interpolation of the actual position of the aircraft on the runway (if the position of the aircraft on the runway is available, and therefore able to be determined by a standard sensor of the data generation unit 3).

To do this, the computer or processor uses the following expression:

$$dE1 = X(t_{end}) - X(t_{start})$$

in which:

$X(t_{start})$ represents the position at a time $t_{start}$, corresponding to the upstream position of the interval, that is to say on entry to the corresponding friction reduction segment, where the aircraft is rolling at the ground speed $V_{start}$; and $X(t_{end})$ represents the position at a time $t_{end}$, corresponding to the downstream position of the interval, that is to say on exit from the friction reduction segment, where the aircraft is rolling at the ground speed $V_{end}$.

This operation is repeated for each limited friction segment, the final result being the fruit of the concatenation of the various braked phases.

In a second embodiment, the computation element 16 comprises a computer or processor which computes the actual distance dE2 by integrating the aircraft's actual ground speed V, generated by a standard sensor of the data generation unit 3. To do this, the computer or processor uses the following expression:

$$dE2 = \int_{t_{start}}^{t_{end}} V(t) \cdot dt$$

Moreover, the computation element 16 also comprises a computer or processor (integrated) which computes the speed interval or intervals by defining a friction (or adhesion) limitation zone corresponding therefore to a segment of the runway, for which the braking of the aircraft is limited (or reduced) by the friction (or adhesion) of the runway. To do this, the computer or processor uses at least one of the following procedures:

A/ a first procedure comprising or consisting of determining and in comparing the braking pressure commanded on the aircraft with the (corresponding) braking pressure which is actually applied to the aircraft. As soon as the applied pressure becomes lower to within a predetermined margin, for example at least for a (short) duration of confirmation, than the commanded pressure, it is considered that the aircraft is entering a friction limitation zone. Indeed, in case of friction limitation, the applied braking is automatically relaxed, and it is therefore smaller than the commanded braking. The aircraft is considered to remain in the friction limitation zone as long as this condition remains fulfilled; or B/ a second procedure comprising or consisting of comparing the actual (or real) deceleration of the aircraft, subsequent to a braking of the aircraft, with the deceleration which is expected on the aircraft subsequent to this same braking. As soon as the actual deceleration becomes lower, to within a predetermined margin, for example at least for a (short) duration of confirmation, than the expected deceleration, it is considered that the aircraft is entering a friction reduction zone. Indeed, in a friction reduction zone, the deceleration is lower than that expected on an uncontaminated zone. The aircraft is considered to remain in the friction reduction zone as long as this condition remains fulfilled.

Moreover, the computation element 17 computes each reference distance $D_{REF_i}$, corresponding to a runway state referenced by an index i, between the speed $V_{start}$ and the speed $V_{end}$ delimiting the speed interval.

The computation element 17 uses, to do this, the following expression:

$$D_{Ref_i} = \int_{V_{start}}^{V_{end}} \frac{m \cdot V}{T - D - \mu_{REF_i} \cdot Fz_{MG} - \mu_r \cdot Fz_{NG}} dV$$

in which:

MG refers to the main landing gear ("Main Gear") of the aircraft, which carries the braked wheels;

NG refers to the front landing gear ("Nose Gear") of the aircraft, which carries the unbraked wheels;

Fz corresponds to the normal force (generated by the mass of the aircraft) which is applied to the corresponding landing gear of the aircraft, $Fz_{MG}$ to the main landing gear and $Fz_{NG}$ to the front landing gear;

m is the mass of the aircraft;

V is therefore the actual ground speed of the aircraft;

T is a longitudinal thrust generated by the engines of the aircraft while the aircraft is rolling;

D is a drag of the aircraft while rolling;

$\mu_r$ is a coefficient of friction due to the rolling resistance of the unbraked wheels; and $\mu_{REF_i}$ is a predetermined reference friction level, for the state i, i going from 1 to n, and n being preferably equal to 6.

All the forces in the above expression (thrust, drag, and vertical loads on the various landing gear) are computed in a standard manner by the estimation unit 4 or by the data generation unit 3, using models of the aircraft.

Figure 3:
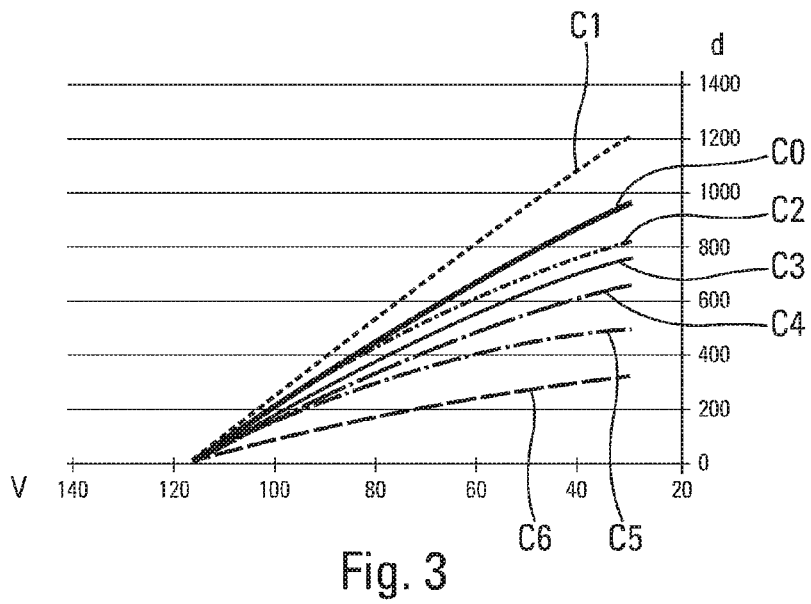
FIGS. 3 through 5 show various graphics which enable important characteristics of the disclosure herein to be clearly explained.

FIG. 3 is a graphic which makes it possible to illustrate a concrete example. This FIG. 3 comprises a plurality of curves C0 and C1 to C6 which represent the distance d (expressed in meters) as a function of the ground speed V of the aircraft (expressed in knots).

Curve C0 illustrates the actual distance, and curves C1 to C6 illustrate the reference distances relating to six different runway states. These six runway states correspond respectively for:

i=1, to a "poor" state;
i=2, to a "medium to poor" state;
i=3, to a "medium" state;
i=4, to a "good to medium" state;
i=5, to a "good" state;
i=6, to a "dry" state.

As is visible in FIG. 3, in this example, the actual distance (curve C0) lies between the reference distances relating, respectively, to the "poor" (C1) and "medium to poor" (C2) states. This means that the actual distance is better than that of the "poor" state, but worse than that of the "medium to poor" state.

Consequently, the result provided by the estimation unit 4 of the device 1 (FIG. 1), in this specific example of FIG. 3, indicates that the runway exhibits, as runway state, a "medium to poor" state (C2).

To make the selection, the selection element 21 selects, from among the reference distances $dR_1$, the reference distance for which the difference between the actual distance dE and this reference distance exhibits a negative value, and whose absolute value is the lowest. In the case where all the values (of differences) are positive, the braking performance is worse than that relating to the "poor" state. In this case, the device 1 indicates that the adhesion is zero and that the runway must be closed and operations must be halted.

Moreover, it is apparent that, in particular situations, the computed distances may not be representative of the actual stopping distance of the aircraft, for example in the case of inhomogeneous contamination where outside of the friction limitation zones, the aircraft achieves better performance than in the friction limitation zones.

The comparisons between the actual distance and the reference distances are carried out only between speeds $V_{start}$ and $V_{end}$ such as defined hereinabove, thus corresponding to the friction limitation interval (or intervals). In certain cases, the overall landing distance (including zones where friction limitation is absent) is better than that detected by the device 1 on the friction reduction zones.

In this particular case, the runway state provided by the device 1 and corresponding to that of the friction limitation zone, may be too penalizing for the general performance including at least one zone where the braking is not limited by the friction of the runway.

Consequently, the runway state determined by the estimation unit 4 in the aforementioned manner can be modified as a better runway state (of higher index), if the following condition (of application) is fulfilled:

$$\int_\Omega \frac{m \cdot V}{T - D - \mu_{REF} \cdot F_{ZMG} - \mu_r \cdot F_{ZNG}} dV \rangle \int_\Omega V dt$$

in which:

$\mu_{REF}$ is the predetermined reference friction level; and $\Omega$ represents the set of braking zones (with friction limitation and without friction limitation).

If the above application condition is fulfilled, the actual stopping performance of the aircraft is better than that which could be predicted, by assuming that the runway state is determined by the device 1 (on friction limitation zones only) was the same on all the braking portions.

The verification hereinabove can be repeated for all the available reference levels, to decide on the runway state to be chosen.

The estimation unit 4 comprises, for this purpose, a computation element 23 ("COMPUTATION") which verifies whether the aforementioned application condition is fulfilled, by therefore verifying whether:

$$\int_\Omega \frac{m \cdot V}{T - D - \mu_{REF} \cdot F_{ZMG} - \mu_r \cdot F_{ZNG}} dV \rangle \int_\Omega V dt$$

As a variant, the actual distance obtained in the above expression by integrating the ground speed can be replaced with an actual distance computed according to another procedure, and in particular by interpolating the actual position of the aircraft.

Moreover, the reference levels (or runway states) determined by the device 1 can contain uncertainties, and thus lead to inaccuracies in the results provided by a given aircraft.

Defects in the accuracy of the measurements and models are propagated in the computations of the device 1 and limit theoretical accuracy of the device 1.

By way of example, the following parameters can impact the accuracy of the results:

measurements of:
the rotation speed of the fan or the engine pressure ratio, both of which may be used in the computation of the thrust;
the calibrated air speed;
the pressure attitude;
the temperature;
the mass of the aircraft;
the center of gravity of the aircraft;
the ground speed;
the accelerations; and
the slope of the landing runway; and
models relating to:
the lift coefficient;
the drag coefficient;
the thrust of the engines; and
the distribution of the vertical loads on the various landing gear.

To take into account this uncertainty in the evaluation of the runway state (and to supplement the runway state information), the estimation unit 4 comprises, as represented in FIG. 1, an auxiliary computation element 24 ("INDICATOR COMPUTATION") which computes a confidence indicator associated with the runway state determined by the device 1.

This confidence indicator is transmitted by the transmission unit 6 with the corresponding runway state information.

In a preferred embodiment, the computation element 24 computes as confidence indicator, a probability $P_i(Y)_0$ of exact estimation of the runway state determined (or estimated). To do this, the computation element 24 computes the probability $P_i(Y)_0$ with the aid of the following expression (specified hereinafter):

$$P_i(Y_0) = \Phi\left(\frac{1-Y_0}{\sigma_Y}\right) - \Phi\left(-\frac{Y_0}{\sigma_Y}\right)$$

To evaluate the aforementioned probability, it is necessary to ascertain:

the estimations of the uncertainties in the measurements and models; and the sensitivity of the results of the device 1 to these uncertainties.

To avoid complex computations, the following assumptions are taken into account:

the uncertainties in the measurements and models can be modeled by normal laws;

the effects on the result of the device 1 are linear; and all the uncertainties in the measurements and models are independent.

In this case, the following statistical principle is used: if a function $f$ depends linearly on a list of parameters $(X_1, X_2, \ldots, X_N)$ and if these parameters are independent, we have:

$$\sigma_f^2 = \sum_{i=1}^{N}\left(\frac{\partial f}{\partial X_j}\right)^2 \cdot \sigma_{X_j}^2$$

with $\sigma$ the standard deviation.

Use is made of a continuous parameter Y defined by:

$$Y = \frac{(dR_i - dE)}{(dR_i - dR_{i+1})}$$

with i the index of the runway state determined by the device 1.

This parameter Y corresponds to the relative position of the real distance between two reference levels. The diagram of FIG. 4 illustrates this expression.

Figure 4:
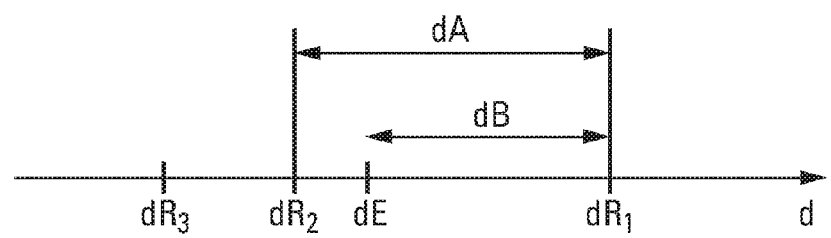

In FIG. 4:

d represents the distance;

$dR_1$, $dR_2$ and $dR_3$ represent reference distances for three different runway states with indices i=1, 2, 3;

dE represents the actual distance defined, in this example, between $dR_1$ and $dR_2$;

$dA = dR_1 - dR_2$; and $dB = dRd_1 - dE$.

Using the above assumptions, we obtain:

$$\sigma_Y^2 = \sum_{i=1}^{N}\left(\frac{\partial Y}{\partial X_j}\right)^2 \cdot \sigma_{X_j}^2$$

with $(X_j)_{1 \leq j \leq N}$ the list of parameters (measurements and models) for which it is desired to take an uncertainty into account.

By virtue of the computation of the device 1, it is possible to evaluate the sensitivity of the result of Y to each parameter $X_j$.

For example, it is possible to use a finite difference procedure. In this case, for each parameter, an additional computation must be carried out with a modification of this parameter to compute:

$$\frac{\delta Y}{\delta X_j} \approx \frac{\Delta Y}{\Delta X_j} = \frac{Y_{\Delta X_j} - Y^{ref}}{\Delta X_j}$$

These computations can be carried out for each particular case at the end of the landing, or they can be carried out for certain reference scenarios. This second variant is less accurate, but more economical from a computation capacity point of view.

The values $\sigma_{X_j}$ are considered to be known by the constructor of the aircraft and provided to the device 1, via the data generating unit 3.

Figure 5:
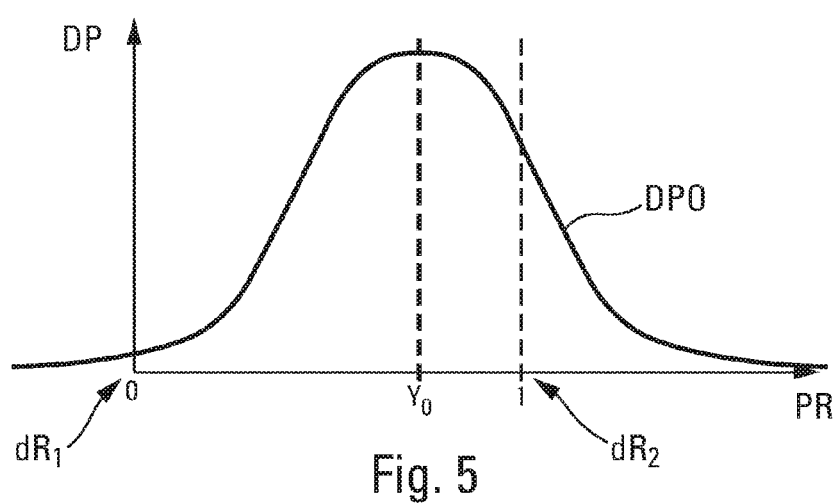

The problem due to the uncertainties can be represented as illustrated in FIG. 5.

In this FIG. 5, the probability density DP has been represented as a function of a relative position PR, in the form of a curve DP0 for a position $Y_0$ situated between positions relating to $dR_1$ and $dR_2$.

The curve DP0 corresponds to the following probability density function:

$$PDF(Y) = \frac{1}{\sigma_Y \sqrt{2\pi}} e^{-\frac{1}{2}\left(\frac{Y-Y_0}{\sigma_Y}\right)^2}$$

with $Y_0$ the reference value of Y determined by the device 1.

Thus, once the standard deviation $\sigma_Y$ has been evaluated and the value of $Y_0$ has been computed, the probability density function is completely known. The aim is to compute the zone under the curve DP0, between the abscissae 0 and 1, which corresponds to the probability of having generated the exact result.

To do this, use is made of the cumulative distribution function, which is defined by:

$$\Phi(Z) = \frac{1}{\sqrt{2\pi}} \cdot \int_{-\infty}^{Z} e^{-\frac{t^2}{2}} dt$$

By virtue of this function, the probability that the device 1 has generated the exact (or right) result, for each particular case, is:

$$P_i(Y_0) = \Phi\left(\frac{1-Y_0}{\sigma_Y}\right) - \Phi\left(-\frac{Y_0}{\sigma_Y}\right)$$

The computation of this probability representing the confidence indicator can be carried out by the auxiliary computation element 24, with the aid of an integrated neural network, which computes the gradient values to be used for each flight condition.

This additional information relating to the confidence indicator can aid the air traffic controllers to choose between various results provided by successive aircrafts on the same landing runway, in the cases where these results are not the same for the various aircraft.

Taking a confidence indicator into account for successive flights makes it possible to evaluate whether the uncertainties observed on the aircrafts are due to uncertainties in models and in inputs or else to actual operational factors (fast degradation of friction, different lateral path of one aircraft with respect to those of other aircraft, etc.).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for automatically determining a runway state, the method comprising:
    a data generating step comprising generating a current value of at least one parameter of an aircraft, during ground rollout of the aircraft on a runway;
    an estimation step comprising estimating at least one runway state with aid of the current value; and
    a transmission step comprising transmitting at least one item of information relating to the runway state to at least one user outside the aircraft,
    wherein the estimation step comprises:
    a first computation sub-step comprising computing an actual distance, representing distance covered by the aircraft over at least one speed interval delimited between two speeds of the aircraft, the speed interval corresponding to rollout on at least one segment of the runway, for which a braking performance of the aircraft is limited by adhesion of the runway, wherein the first computation sub-step comprises computing the at least one speed interval by defining an adhesion limitation zone corresponding to a segment of the runway, for which the braking performance of the aircraft is limited by a maximum adhesion that can be offered by the runway due to contaminants on a surface of the runway;
    a second computation sub-step comprising computing over the at least one speed interval, a plurality of reference distances corresponding, respectively, to various runway states;
    a comparison sub-step comprising comparing the actual distance with the reference distances; and
    a selection sub-step comprising selecting, on a basis of the comparisons, one of the reference distances, the runway state which corresponds to the reference distance thus selected representing the runway state determined by the method.

2. The method as claimed in claim 1, wherein the first computation sub-step comprises computing the actual distance by interpolation of an actual position of the aircraft on the runway.

3. The method as claimed in claim 1, wherein the first computation sub-step comprises computing the actual distance by integration of an actual ground speed of the aircraft.

4. The method as claimed in claim 1, wherein the first computation sub-step comprises computing the at least one speed interval with at least one of:
    a first procedure comprising comparing at least one braking pressure commanded on the aircraft with the corresponding braking pressure applied to the aircraft; and/or
    a second procedure comprising comparing at least one actual deceleration on the aircraft, in response to a braking implemented on the aircraft, with the expected deceleration on the aircraft in response to the same braking.

5. The method as claimed in claim 1, wherein the second computation sub-step comprises computing each reference distance $D_{REF_i}$, corresponding to a runway state referenced by an index i, with aid of a following expression:

$$D_{Ref_i} = \int_{V_{start}}^{V_{end}} \frac{m \cdot V}{T - D - \mu_{REF_i} \cdot Fz_{MG} - \mu_r \cdot Fz_{NG}} dV$$

in which:
    $V_{start}$ is a first of the speeds delimiting the speed interval;
    $V_{end}$ is the second of the speeds delimiting the speed interval;
    MG refers to main landing gear of the aircraft, which carries the braked wheels;
    NG refers to front landing gear of the aircraft, which carries the unbraked wheels;
    Fz corresponds to a normal force applied to the corresponding landing gear of the aircraft;
    m is mass of the aircraft;
    V is an actual ground speed of the aircraft;
    T is a longitudinal thrust generated by the engines of the aircraft during rollout of the aircraft;
    D is a drag of the aircraft during rollout;
    $\mu_r$ is a coefficient of friction due to the rolling resistance of the unbraked wheels; and
    $\mu_{REF_i}$ is a predetermined reference friction level, for the runway state of index i.

6. The method as claimed in claim 1, wherein the selection sub-step comprises selecting, from among the reference distances, the reference distance for which the difference between the actual distance and this reference distance exhibits a negative value, and whose absolute value is the lowest.

7. The method as claimed in claim 1, wherein the estimation step comprises a third computation sub-step comprising verifying whether an application condition is fulfilled, by verifying whether:

$$\int_\Omega \frac{m \cdot V}{T - D - \mu_{REF} \cdot Fz_{MG} - \mu_r \cdot Fz_{NG}} dV \rangle \int_\Omega V dt$$

in which:
    $\Omega$ represents the set of braking zones;
    MG refers to the main landing gear of the aircraft, which carries the braked wheels;
    NG refers to the front landing gear of the aircraft, which carries the unbraked wheels;

Fz corresponds to a normal force applied to the corresponding landing gear of the aircraft;
m is the mass of the aircraft;
V is an actual ground speed of the aircraft;
T is a longitudinal thrust generated by the engines of the aircraft during rollout of the aircraft;
D is a drag of the aircraft during rollout;
$\mu_r$ is a coefficient of friction due to the rolling resistance of the unbraked wheels; and
$\mu_{REF}$ is a predetermined reference friction level.

8. The method as claimed in claim 1, wherein the estimation step comprises an auxiliary computation sub-step comprising computing a confidence indicator associated with the runway state determined, the confidence indicator being transmitted in the transmission step with the runway state information.

9. The method as claimed in claim 8, wherein the auxiliary computation sub-step comprises computing, as confidence indicator, a probability $P_i(Y)_0$ of exact estimation of the runway state determined, the probability being computed with the aid of the following expression:

$$P_i(Y_0) = \Phi\left(\frac{1-Y_0}{\sigma_Y}\right) - \Phi\left(-\frac{Y_0}{\sigma_Y}\right)$$

in which:
$Y_0$ is a reference value;
$\Phi$ is a cumulative distribution function; and
$\mu_Y$ is a standard deviation.

10. A device for automatically determining a runway state, the device comprising:
a data generating unit configured to generate a current value of at least one parameter of an aircraft, during ground rollout of the aircraft on a runway;
an estimation unit configured to estimate at least one runway state with aid of the current value; and
a transmission unit configured to transmit at least one item of information relating to the runway state to at least one user outside the aircraft,
wherein the estimation unit comprises:
a first computation element configured to compute a so-called actual distance, representing distance covered by the aircraft over at least one speed interval delimited between two speeds of the aircraft, the speed interval corresponding to rollout on at least one segment of the runway, for which the braking performance of the aircraft is limited by adhesion of the runway, wherein computing the actual distance comprises computing the at least one speed interval by defining an adhesion limitation zone corresponding to a segment of the runway, for which the braking performance of the aircraft is limited by a maximum adhesion that can be offered by the runway due to contaminants on a surface of the runway;
a second computation element configured to compute over the at least one speed interval, a plurality of reference distances corresponding, respectively, to various runway states;
a comparison element configured to compare the actual distance with the reference distances; and
a selection element configured to select, on a basis of the comparisons, one of the reference distances, the runway state which corresponds to the reference distance thus selected representing the runway state determined by the device.

11. The device as claimed in claim 10, wherein the estimation unit comprises a third computation element configured to verify whether an application condition is fulfilled.

12. The device as claimed in claim 10, wherein the estimation unit comprises an auxiliary computation element configured to compute a confidence indicator associated with the runway state determined, the confidence indicator being transmitted by the transmission unit with the runway state information.

13. The device as claimed in claim 12, wherein the auxiliary computation element comprises a neural network.

14. An aircraft, which comprises at least one device for determining a runway state as claimed in claim 10.

15. A system for aiding landing of aircraft, the system comprising at least one device for determining a runway state as claimed in claim 10 fitted to at least one aircraft, and a ground station able to receive an item of information relating to the runway state determined by the device.

* * * * *